United States Patent [19]

Churkin et al.

[11] Patent Number: 4,856,414
[45] Date of Patent: * Aug. 15, 1989

[54] VISCOELASTOPLASTIC-SEALANT PACKED FLEXIBLE POWER TRANSMISSION CABLE FOR HYDRAULIC ACTUATOR

[75] Inventors: Vladimir G. Churkin; Sergei B. Negrutsky; Sergei B. Klimov; Boris F. Negrutsky, all of Karaganda, U.S.S.R.

[73] Assignee: Upravlenie po Montazhu, Demontazhu i Remontu Gornoshakhtnogo Oborudovania "Spetsshakhtomontazh" Karagandinskogo Proizvodstvennogo Obiedinenie po Dobyche Uglya "Karagandaugol", Karaganda, U.S.S.R.

[*] Notice: The portion of the term of this patent subsequent to Dec. 15, 2004 has been disclaimed.

[21] Appl. No.: 829,125
[22] PCT Filed: Nov. 2, 1985
[86] PCT No.: PCT/SU84/00059
 § 371 Date: Dec. 19, 1985
 § 102(e) Date: Dec. 19, 1985
[87] PCT Pub. No.: WO85/04913
 PCT Pub. Date: Nov. 7, 1985

[30] Foreign Application Priority Data

Apr. 24, 1984 [SU] U.S.S.R. ............... 3730996
Apr. 24, 1984 [SU] U.S.S.R. ............... 3732435

[51] Int. Cl.[4] .................. D07B 7/12; F15B 15/14; F16J 15/48; F16J 15/56
[52] U.S. Cl. ........................................ 92/83; 92/137; 92/153; 57/7; 57/217; 57/221; 118/405; 427/434.7; 184/15.1
[58] Field of Search ............... 92/83, 86.5, 137, 153, 92/DIG. 2; 277/1, 135, DIG. 6; 184/15.1; 118/405; 427/434.7; 57/217, 221, 223, 7

[56] References Cited

U.S. PATENT DOCUMENTS

| 3,318,082 | 6/1964 | Riggs | 57/149 |
| 3,547,005 | 3/1967 | Van der Aa | 92/83 |
| 3,717,071 | 2/1973 | Gordon | 92/137 |
| 3,733,216 | 5/1973 | Goldman et al. | 184/15.1 X |
| 3,824,777 | 7/1974 | Riggs | 57/217 X |
| 3,865,015 | 2/1975 | Hakansson | 92/153 X |
| 4,057,956 | 11/1977 | Tolle | 57/164 |
| 4,202,164 | 5/1980 | Simpson et al. | 57/7 X |
| 4,233,886 | 11/1980 | Balzano et al. | 92/86.5 |
| 4,473,936 | 10/1984 | Kellner et al. | 57/7 X |
| 4,498,558 | 2/1985 | Bendahan | 184/15.1 |
| 4,501,115 | 2/1985 | Suzuki et al. | 57/223 X |
| 4,712,772 | 12/1987 | Negrutsky et al. | 74/128 X |

FOREIGN PATENT DOCUMENTS

| 988366 | 5/1976 | Canada | 92/86.5 |
| 82-01201 | 4/1982 | European Pat. Off. . | |
| 3202236 | 3/1983 | Fed. Rep. of Germany . | |
| 2352186 | 12/1977 | France . | |
| 10904 | 1/1977 | Japan | 92/153 |
| 118255 | 4/1958 | U.S.S.R. . | |
| 446646 | 4/1975 | U.S.S.R. . | |
| 497372 | 4/1976 | U.S.S.R. . | |
| 1040262 | 9/1983 | U.S.S.R. . | |
| 1048113 | 10/1983 | U.S.S.R. . | |

OTHER PUBLICATIONS

Kisina et al., "Experience of Using Hydroinsulating Materials Based on Ethylene Propylene Rubbers," Leningrad Cntr. of Scientific-Technical Propaganda: Leningrad, S.U., 6/1974.

Primary Examiner—Robert E. Garrett
Assistant Examiner—George Kapsalas
Attorney, Agent, or Firm—Fleit, Jacobson, Cohn, Price, Holman & Stern

[57] ABSTRACT

A method of packing elongated porous bodies moved between zones of different pressure, wherein the porous body (T) reciprocates through a pressurized packing agent (M). The packing agent is thixotropic and is supplied continuously to the porous cable (T) under a pressure exceeding the pressure in a higher pressure zone ($P_1$) while the porous body (T) is impregnated with a thixotropic packing agent (M) such that the cross-section of the cable, throughout its entire length, is filled with packing agent (M). A hydraulic cylinder-type actuator utilizes a porous cable power transmission element packed in a chamber (7) filled with viscoelastoplastic material and communicated with means designed to develop in said chamber a pressure exceeding the pressure of the actuator working fluid.

10 Claims, 3 Drawing Sheets

VISCOELASTOPLASTIC-SEALANT PACKED FLEXIBLE POWER TRANSMISSION CABLE FOR HYDRAULIC ACTUATOR

BACKGROUND OF THE INVENTION

The present invention relates to mechanical engineering and, more particularly, it relates to a method of packing long-sized porous bodies such as locked-coil steel ropes or stacked bands used as traction members, for example, in hydraulic cylinders with a flexible piston rod.

This invention can be used most advantageously for packing long-sized porous bodies operating in a fluid medium between zones of different pressure, for example, in hydropneumatic cylinders with rods in the form of long-sized porous bodies such as ropes which may be employed in hoisting devices, in feed systems of mining machines, in various cranes, in feed means of drilling tools, in power rigging for moving mine headframes and other buildings and structures.

The present invention can also be used for the sealing and protection of long-sized porous bodies subjected to the effect of seawater, mine water and atmosphere and to other corrosion effects.

A problem exists in the tightness of seal and corrosion resistance of long-sized porous bodies operating in zones with different pressure. Such bodies may include the rods of hydraulic and pneumatic cylinders, especially, flexible rods in the form of ropes. Conventional cable compound based on thickened petroleum oils filling the interwire space of ropes is, under the effect of pressure difference between zones of different pressure, squeezed out to the zone of lower pressure, comes out to the rope surface and is removed therefrom.

Fluid medium rushes to the thus formed voids, laying down passages in the interwire space for coming out to the zone of lower pressure while bypassing the sealing members designed to seal the outer surface of the rope. This causes a loss of seal by hydraulic cylinders with flexible rods, a reduction of working pressure and traction force of the hydraulic cylinder, as well as inconsiderable leakage of the fluid medium used as the working fluid in the hydraulic cylinder and lost irreparably in the space surrounding the cylinder.

In hoisting facilities, for example, the discharge of cable compound from the inner interwire space of the rope to the outside and the formation of interwire voids filled with corrosive medium is observed when the rope passes round a snatch pulley changing the rope direction in space, during which passage there is changed both the relative position of individual wires and of rope layers relative each other.

This is conducive to intensive corrosion of rope wires and premture failure of the rope.

In order to preclude the afore-described phenomena, it is expedient that the pores of a long-sized porous body, especially of a body such as rope, be filled with a packing substance capable of withstanding the violation of its uniformity under the effect of mechanical and hydraulic loads.

There is known a method of greasing a steel rope (cf., PCT Application No. 82/01201, Int. Cl. D 07 B 7/12// B 05 C 3/12), which comprises drawing the rope through a chamber filled with lubricant under pressure. Use is made of a fluid lubricant, preferably, machine oil, supplied to the chamber by a pump at discharge pressure. The rate of drawing the steel rope through the chamber is selected such that the spaces in the rope should absorb the oil but that there should be no efflux of oil.

However, the use of oils as packing substance does not enable one to attain internal tightness of a long-sized porous body in the form of a rope due to low resistance of fluid lubricants to shear stresses occurring during operation of ropes in supports between rope layers and individual wires under the effect of pressure difference between zones with different pressures and of rope bending loads. This results in a flow of grease in the interwire space, its extrusion outside of the rope, penetration of the working fluid inside the rope and gradual loss of seal by the higher-pressure zone filled with working fluid whose composition differs from that of the packing grease.

There is known a method of external coating of a rope by drawing it through a chamber filled with a pressurized compound of uncured rubber, with subsequent curing of the rubber (cf., U.S. Pat. No. 4,057,956, class D 07 B 1/16, published Nov. 15, 1977).

Said latter prior art method only permits of coating with a packing layer of cured rubber the pores on the external surface of a long-sized porous body and fails to ensure the filling with the packing of inner pores, i.e., interwire space of the rope, because of insufficient plasticity of the packing material.

Moreover, the rubber compound is characterized by low thixotropic properties ensuring a rapid restoration of broken bonds between particles of substance and of the substance structure, which leads to the loss of uniformity of packing material when it is forced through pores of different shapes. Therefore, when a long-sized porous body with an outer rubber coating is used as a flexible rod of pneumohydraulic cylinders passing round a snatch pulley, considerable unit pressures in the zone of contact between the flexible rod and pulley cause gradual deterioration of the external coating and the communication of the surrounding fluid medium via thus formed ruptures with inner pore voids. Further, when a portion with deteriorated coating emerges in the higher-pressure zone, pressurized working fluid penetrating the long-sized porous body and seeking to leave said body via internal passages in the lower-pressure zone affects the rubber coating from the inside. The coating starts acting as a rubber hose communicated with the higher-pressure zone, however, since it is not protected by external reinforcing members, the coating is only capable of providing a seal against low internal pressure; otherwise, the coating will deteriorate and the long-sized porous body will lose its seal. In addition, the external coating of ropes is subject to mechanical effect of relatively moving wires of the upper layer which add to the deformation of the coating.

All this will affect the reliability of seal of long-sized porous bodies packed by the prior art method.

It is especially important to ensure a reliable seal of porous bodies such as ropes used as flexible rods of hydraulic cylinders, which may be employed advantageously to provide for an adequately long stroke of the piston with the hydraulic cylinder developing considerable forces.

Known in the art is a power cylinder with a flexible piston rod (cf., U.S.S.R. Inventor's Certificate No. 1,048,113, Int. Cl. E 21 C 5/06), comprising a cylinder with a piston, front and rear covers to each of which there are attached packing assemblies of the flexible rod fashioned as traction rope. The packing assembly is made in the form of a sleeve mounted for rotation in the cylinder body and accommodating thereinside a stack of packing elements. The cylinder utilizes compressed air as the working medium. In so doing, the operation of the cylinder involves considerable losses of the working medium due to a rapid wear of the stack of packing elements upon repeated passage of the flexible rod therethrough. The loss of the working medium is further caused by the fact that the stack of packing elements made of an elastic material does not provide for a tight fit of the inner surface relative to the flexible rod because the diameter of the latter varies in the course of operation under different loads. In addition, the loss of the working medium occurs through the interwire space in the rope cross-section. The loss of working medium causes a considerable reduction in the power and efficiency of the power cylinder.

There is also known a prior art power cylinder with a resilient packing element of the rope (cf., U.S.S.R. Inventor's Certificate No. 446.646, Int. Cl. E 21 C 5/06 // F 16 j 15/56), comprising a resilient element, a gland packing encompassing the rope and a pressure member interacting with the gland packing and feed cylinder cover through the intermediary of a threaded joint, the pressure member being made in the form of coaxially arranged tapered sleeves one of which is split while the other one interacts with the cylinder cover and split sleeve through the intermediary of resilient element.

The operation of said prior art cylinder is accompanied by a decrease in the amount of packing in the chamber (due to its carryover by the rope). The loss of density of packing caused by its carryover by the rope is compensated for by the resilient element pressing against the packing.

Under elevated pressures, however, there occurs a loss of the working medium both through the gland packing because of its fibrous structure and through the rope section via interwire space, which prevents the power cylinder from developing great forces.

Further known in the art is a power cylinder (cf., U.S.S.R. Inventor's Certificate No. 1,040,262, Int. Cl. F 16 L 1/04) comprising a piston placed in a cylindrical body and having a flexible traction rod (rope) passed through an axial opening in a cover attached to the cylindrical body, said cover provided with a packing in the form of a chamber filled with a viscous material and communicated with a froth generator coupled hydraulically to a pressure source and mounted on the apparatus outside of the end cover thereof. In the case of considerable loss of working medium through the packing chamber, the latter is supplied with a foaming agent increasing the viscosity of the material and causing an increase of the hydraulic resistance of fluid in the packing chamber.

The fact that the packing is based on increasing the viscosity of the fluid present in the packing chamber and raising, as a result, its hydraulic resistance does not rule out the leakage of fluid. This leakage is directly proportional to the pressure inside the packing chamber and to the rate of travel of the traction rod (rope). In addition, the leakage occurs through the rope body via interstices between the rope wires. Said leakage is so high as to prohibit the use of such packing in hydraulic cylinders with high working pressure and with high frequency of reciprocation of the piston with flexible rod.

SUMMARY OF THE INVENTION

The present invention is aimed at developing a method of packing long-sized porous bodies moved with a high frequency between zones of different pressure (for example, rods of hydraulic cylinders) wherein a packing agent would be supplied to the porous body such as to reduce the porosity of said body and provide for a reliable adhesion of the porous body material and packing agent thereby developing reliable packing between zones featuring considerable pressure difference.

This invention resides essentially in that, in the method of packing long-sized porous bodies moved between zones of different pressure, wherein the porous body moved between zones of different pressures is passed through a pressurized packing agent, according to the present invention, the packing agent is an agent possessing thixotropic properties and supplied continuously to the porous body under pressure exceeding the pressure in a higher pressure zone while the porous body is impregnated with a thixotropic packing agent such that the cross-section of the porous body throughout the entire length thereof be filled with packing agent.

Such a method of packing long-sized porous bodies makes for a reliable sealing of a long-sized porous body passed through zones of different pressure.

This attained owing to the fact that the use of an agent possessing good thixotropic properties leading to a rapid restoration of broken bonds between particles for packing a long-sized porous body provides for the restoration of uniformity of the structure of the packing agent itself supplied continuously inside the porous body via its pores under pressure exceeding the pressure in the higher pressure zone such that the cross-section of the porous body throughout the entire length thereof be filled with the packing agent without the loss of uniformity and, in case a rope is used as the long-sized porous body, makes for the closure of interwire voids emerging in the course of operation due to relative shift of individual wires and layers of the rope upon bending the latter.

It is expedient that an agent possessing viscoelastoplastic properties be used as the packing material.

The use as the packing material of an agent possessing both the viscoplasticity property consisting in the ability of a substance to flow like a fluid under the effect of pressure beyond the critical load limit and the elasticity property inherent in solid bodies and consisting in the ability of a body to retain its structure under the effect of a load, makes it possible to introduce the packing material inside a long-sized porous body under pressure exceeding the pressure in the higher pressure zone, s well as precludes the squeezing out of the packing agent from the pores of the long-sized porous body upon its transition from a higher pressure zone to a lower pressure zone.

It is preferable that the packing agent should consist of a sealing compound having the following composition (mass percent):

| | |
|---|---|
| ethyl propylene rubber | 10.0–17.1 |
| butyl rubber | 1.9–5.0 |
| industrial oil | 10.0–5.0 |
| filler (chalk) | the balance. |

The foregoing composition of the packing material is noted for viscoeleastoplastic properties required to ensure a reliable sealing of a long-sized porous body moved between zones of different pressure.

In addition, the porous body in the form of a rope is impregnated by repeatedly reciprocating said rope through the packing agent under pressure and temperature conditions ensuring the fluidity of the packing agent and its penetration throughout the entire cross-section of the rope.

This provides for a uniform filling of the interwire space of the rope with the packing agent, as well as for a reduction of residual stresses between the rope layers occurring upon the twisting of the rope and causing individual wires to come out of the external layer upon the bending of the rope round a snatch pulley.

The herein disclosed method of packing is utilized in a hydraulic cylinder with a flexible piston rod, said cylinder comprising a housing with a space filled with a pressurized working fluid, said space accommodating there-inside a piston coupled to a flexible rod in the form of rope and provided with at least one space packing assembly having a chamber filled with a viscous packing agent, through which chamber there is passed the flexible rod, wherein the viscous packing agent is preferably a viscoelastoplastic material while the chamber of the packing assembly is preferably formed between two packing members positioned in the housing space and coupled to means designed to develop in said chamber a pressure exceeding the pressure of the working fluid in the space of the housing.

Such a structural arrangement of the hydraulic cylinder makes for improved reliability of packing the space of the hydraulic cylinder through which the flexible rod is passed.

It is desirable that the flexible rod be a locked-coil rope having its interwire space throughout the entire length thereof filled with the viscoeleastoplastic material which also fills the chamber of the packing assembly.

The use of a locked-coil rope whose interwire space is filled with a viscoelastoplastic material enables the cylinder to operate under high pressures. The use of identical compositions of the viscoelastoplastic material in the packing chamber and in the interwire space of the rope provides for the restoration of uniformity of the viscoelastoplastic material in the interwire space of the rope, this improving the reliability of sealing.

It is expedient that in the herein disclosed hydraulic cylinder the means for developing pressure in the chamber of the packing assembly be fashioned as a pressure transducer having a lower pressure input and a higher pressure output, the higher pressure output being communicated with the chamber of the packing assembly and the lower pressure input-with the space of the hydraulic cylinder housing.

Such an arrangement of the pressure transducer provides for a compact structure.

It is further expedient that the pressure transducer be provided with a pressure regulator designed to develop in the chamber of the packing assembly a constant pressure difference relative to the pressure of the working fluid.

The provision of the pressure transducer with a pressure regulator helps reduce the loss of viscoelastoplastic material from the chamber.

It is possible that in the herein disclosed hydraulic cylinder the means for developing pressure in the chamber of the packing assembly be fashioned as a stepped piston designed to increase the pressure of the lower pressure step to the pressure of the higher pressure step and mounted in the space of the hydraulic cylinder housing such that its higher pressure step passes through a packing member to the chamber of the packing assembly and exerts pressure on the viscoeleastoplastic material filling the chamber while the lower pressure step is positioned in the space of the hydraulic cylinder housing to take up the working fluid pressure, the stepped piston having an axial opening through which the flexible rod is sealingly passed.

The arrangement of the pressure developing means as a stepped piston makes for a simpler design and reduced overall dimensions of the packing chamber.

It is expedient that the stepped piston be provided with a pressure regulator fashioned as a circular groove arranged on the higher pressure step of the piston and communicated with the housing space via pressure difference valve for developing a backpressure on the lower pressure step to thereby develop in the chamber of the packing assembly a constant pressure difference relative to the working fluid pressure.

The provision of the stepped piston with a pressure regulator in the form of a circular groove and the communication of the latter with the housing space via pressure difference valve makes for the optimum pressure in the packing chamber thereby reducing the loss of viscoelastoplastic material from the packing chamber.

It is also possible to rigidly couple the stepped piston to a packing member movably mounted in the housing space.

Such an arrangement simplifies the structure of the hydraulic cylinder.

BRIEF DESCRIPTION OF THE DRAWINGS

The present invention will be better understood upon considering the following detailed description of exemplary embodiments thereof, with due references to the accompanying drawings in which.

DETAILED DESCRIPTION OF THE INVENTION

Figure 1:
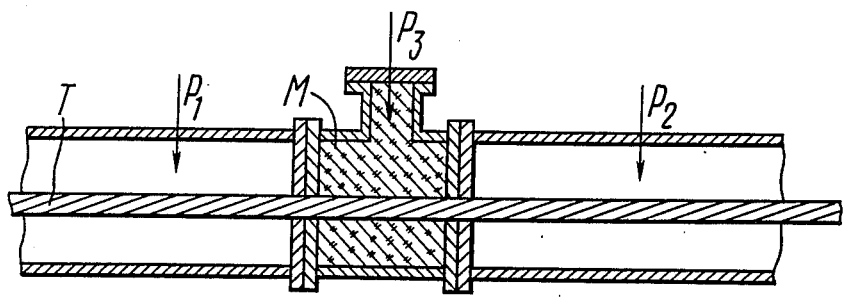
FIG. 1 shows schematically a packing assembly embodying the method of packing long-sized porous bodies according to the present invention.

The present invention consists essentially in that a porous body T (FIG. 1) moved between zones $P_1$ and $P_2$ of different pressure is passed through a packing agent M which is under pressure exceeding pressure in the zone $P_1$. If $P_1$ and $P_2$ denote the pressure in the respective zones between which the body T is moved and $P_3$ denotes the packing agent pressure, then, assuming $P_1 > P_2$, pressure $P_3$ shall exceed pressure $P_1$, i.e., $P_3 > P_1$. The packing agent M is continuously delivered to the porous body T under pressure $P_3 > P_1$.

The packing agent used is an agent possessing thixotropic properties. An identical packing agent with thixotropic properties is used to impregnate the porous long-sized body. The packing agent employed is based on high-molecular hydrocarbons possessing the properties of thixotropic restoration of structure including a rapid restoration of broken bonds between particles and acquisition by the latter of the properties of a solid after the load is relieved. Examples of such agents include natural and synthetic rubber-based substances which should also possess viscoelastoplastic properties and are characterized by strength and viscosity qualities. An essential property of such agents is that they do not possess fluidity under regular conditions but acquire the fluidity after being applied a pressure equal to or greater than the critical shear stress or yield limit.

The packing agent preferable for use in accordance with the present invention is the BUTEPROL-2 sealing compound widely used in construction and well known per se, having the following composition (mass percent):

| | |
|---|---|
| ethyl propylene rubber | 10.0–17.1 |
| butyl rubber | 1.9–5.0 |
| industrial oil | 10.0–5.0 |
| filler (chalk) | the balance. |

The BUTEPROL-2 compound is used for sealing joints in building structures in a static position. The joints are filled with compound by means of a gun or manually in tapes.

According to the present invention, the long-sized porous body T is a rope with a round cross-section. The rope is impregnated with the packing agent by repeatedly reciprocating said rope in the direction of its lay through the packing agent M under pressure and temperature conditions ensuring the fluidity of the packing agent and its penetration throughout the entire cross-section of the rope.

Referred to in the present specification as long-sized porous body T is any body of extended length whose cross-section contains voids or pores capable of communicating with each other forming axially and transversely extending passages.

Also referred to as porous body are rigid solid long-sized bodies whose external surface features natural porosity, roughness, fracturing. Rods of hydraulic cylinders may serve an example of such bodies.

At the same time, the use of the herein disclosed method of packing long-sized porous bodies helps reduce the requirements of the finish and quality of the external surface of rods of hydraulic cylinders, as well as sharply reduce their manufacturing costs. Accordingly, it appears attractive to use steel ropes featuring enhanced flexibility as rods of hydraulic cylinders, thereby expanding the functional capabilities of hydraulic cylinders.

Let us now consider the performance of packing when using the packing method of the invention for packing a hydraulic cylinder rod fashioned as a rope.

The use of the herein disclosed method of packing porous bodies in the form of ropes is peculiar in that the rope must be impregnated with the packing agent such that the cross-section of the rope is filled with packing agent. This is attained owing to the fact that the rope is impregnated by repeatedly reciprocating it through the packing agent under pressure and temperature conditions ensuring the fluidity of the packing agent sufficient for its penetration throughout the entire cross-section of the rope.

The reciprocation of the rope facilitates the penetration of the packing agent into interwire voids owing to the fact that the change of direction of the rope travel is accompanied by changes in the gaps between the rope wires and the packing agent passes into the rope under more favorable conditions.

The repeated reciprocation of the rope through the packing agent helps reduce the nonuniformity of filling of the rope cross-section due to variations in the degree of fit of the rope wires against each other upon travel through the compression zone.

In so doing, the choice of the filling pressure and temperature is usually governed by the need for the packing agent to acquire fluidity sufficient for penetration through the gaps formed.

In addition, the use of such method of rope impregnation helps relieve residual stresses between rope layers and individual wires resulting from the loading of the rope, said residual stresses causing undesirable thrusting out of wires relative to the external layer upon the rope travel through the compression zone or round the snatch pulley.

The sealing of zones of different pressure upon passing through them the rope, according to the present invention, is attained as follows.

The fluid medium filling the zone $P_1$ owing to high pressure tends to get through the rope T to the zone $P_2$ of lower pressure. However, since the zones $P_1$ and $P_2$ have between them the packing agent capable of flowing under the effect of applied pressure exceeding the pressure in the zone $P_1$, said agent encompasses the external surface of the rope and compreses the latter to fill the pores on the external surface of the rope. The resulting contact pressure exceeds the pressure in the zone $P_1$. Since the fluid medium cannot spontaneously penetrate from the lower pressure zone to the higher pressure zone, reliable sealing of the external surface of the rope is ensured.

In addition, the packing agent surrounding the external surface restores thixotropic bonds with the packing agent filling the rope cross-section to preclude the medium flow in pores between the rope wires.

In the case of violation of the uniformity of filling the interwire space with the packing agent under the effect of stresses shifting the rope layers relative to each other upon passing round the snatch pulley, the packing agent rushes to the resulting void under the effect of pressure difference upon the travel of the rope, thixotropic bonds are restored between the newly delivered batch and the packing agent earlier filling the interwire space, and the void is closed.

Therefore, the use of the herein disclosed method of packing long-sized porous bodies helps provide for a reliable sealing of zones of different pressure through which the porous body is passed.

The herein disclosed method of packing long-sized porous bodies can be used most conveniently for sealing steel ropes or stacked bands used as flexible rods of hydraulic cylinders which may be used as load-bearing elements in hoisting devices, in feed systems of mining machines, in various cranes, in feed means of drilling tools, in power rigging for moving mine head-frames, blast furnaces, chemical reactors, bridges, building and other structures.

This invention may find application for corrosion protection of long-sized porous bodies when used in media such as seawater, mine water and atmosphere and the like.

Figure 2:
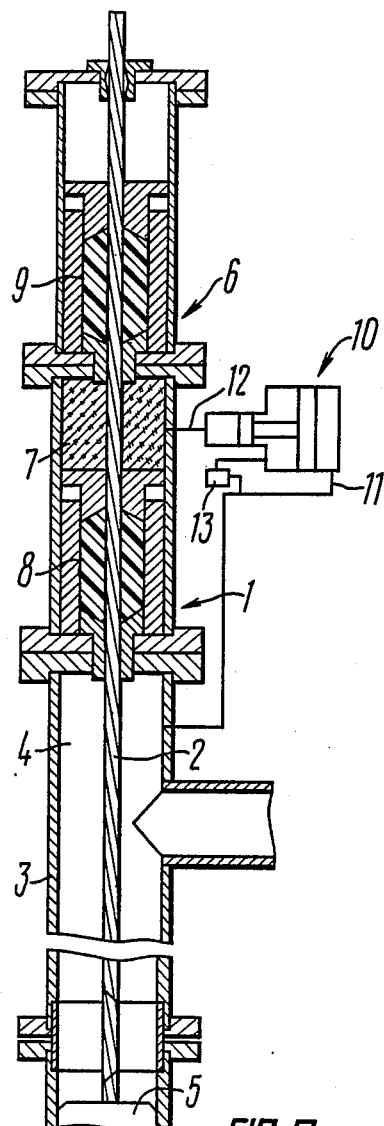
FIG. 2 is a schematic general view of the hydraulic cylinder according to the present invention, in longitudinal section.

Referring now to FIG. 2 of the accompanying drawings, which shows a hydraulic cylinder 1 with a flexible rod 2, according to the present invention, in longitudinal section, the hydraulic cylinder 1 comprises a housing 3 with a space 4 filled with a working fluid. Any conventional working fluid may be used, for example, water-and-oil emulsion, various oils or synthetic fluids.

The housing 3 is made up of individual sleeves joined together. The space 4 accommodates thereinside a piston 5. The piston 5 is rigidly coupled to the flexible rod 2 fashioned as, say, a rope. The cylinder housing 3 is provided, on the side of outlet of the flexible rod 2, with a packing assembly 6 of the space 4 of the housing 3. The packing assembly 6 is fashioned as a chamber 7 filled with a viscous material. The chamber 7 is formed in the space 4 of the housing 3 between two packing members 8, 9. The viscous material is the afore-mentioned viscoelastoplastic material characterized by strength and viscosity properties.

The working fluid is in the space 4 under pressure required for the piston 5 to perform reciprocation. The chamber 7 of the packing assembly 6 is coupled to means 10 for developing pressure therein. Said pressure must exceed the critical shear stress or yield limit of the viscoelastoplastic material and the pressure of working fluid in the space 4 of the housing 3.

During operation of the hydraulic cylinder 1, the flexible rod 2 passes through the chamber filled with the viscoelastoplastic material to be compressed by the latter owing to the pressure difference, thereby precluding the loss of working fluid over the external surface of the rod which ensures the reliability of packing the space 4 of the housing 3 of the hydraulic cylinder 1.

Figure 3:
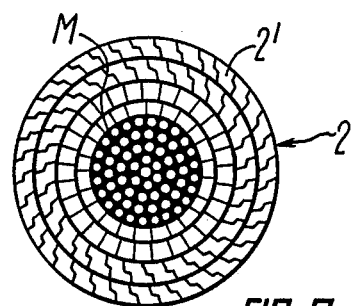
FIG. 3 is a cross-sectional view of a flexible rod in the form of a rope.

The flexible rod 2 shown in cross-section in FIG. 3 is a locked-coil rope. While so long, it is desirable to use a rope of round cross-section wherein the interwire space of the external layer should be minimal and form the so-called "lock-joint" layer. Said lock-joint layer may be formed by profiled wires 2' meshing with each other. The interwire space of the rope is filled with a viscoelastoplastic material M having preferbly the same composition as that in the chamber 7 (FIG. 2) of the packing assembly. Upon travel of the rod 2 through the chamber 7, pressure is transmitted inside its interwire space and interaction takes place between the viscoelastoplastic materials filling the rod and the chamber, as a result of which thixotropic bonds are formed and the uniformity restored of the structure of the material filling the interwire space.

This leads to an improved reliability of sealing and provides for the hydraulic cylinder operation under high pressures.

The means 10 for developing pressure in the chamber 7 of the packing assembly 6 may have any form ensuring the development of pressure in the chamber 7, for example, the form of a separate hydraulic cylinder or pump. In one embodiment, the pressure developing means 10 may be fashioned as a pressure intensifier such as double-diameter cylinder having a lower pressure input 11 and a higher pressure output 12. The input 11 is communicated with the space 4 of the housing of the hydraulic cylinder 1 while the output 12 is communicated with the chamber 7 of the packing assembly 6. This provides for the utilization of pressue in the space 4 of the hydraulic cylinder to develop an increased pressure in the chamber 7. In so doing, whatever the variation of the pressure in the space 4, the pressure in the chamber 7 will always be higher. For the most efficient performance of the packing, one should preferably maintain a constant pressure difference between the chamber 7 and space 4. To this end, the pressure intensifier is provided with a pressure regulator 13.

Figure 4:
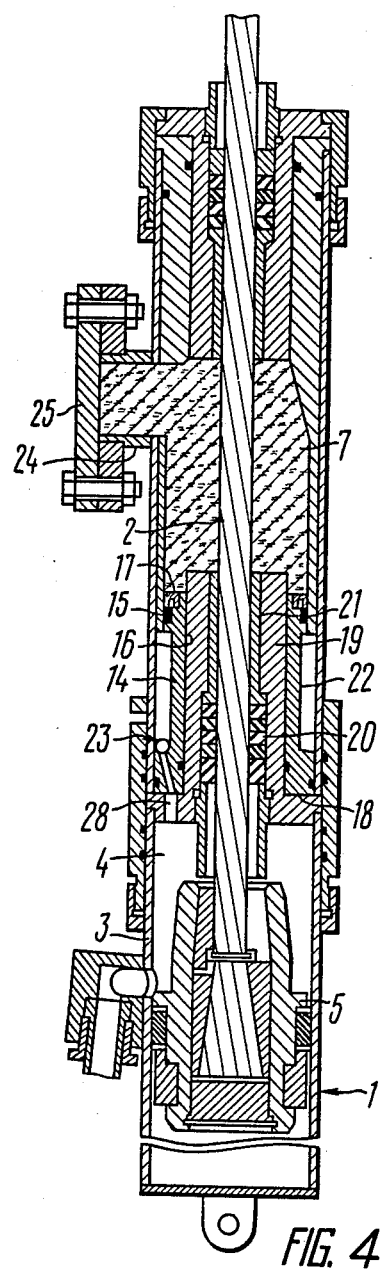
FIG. 4 illustrates an embodiment of the hydraulic cylinder according to the present invention, in longitudinal section.

Shown in FIG. 4 in an embodiment of the hydraulic cylinder 1 wherein the means for developing pressure in the chamber 7 of the packing assembly 6 is fashioned as a stepped piston 14 mounted in the space 4 of the housing 3. The higher pressure step passes through a packing member 15 to the chamber 7 of the packing assembly 6. The stepped piston 14 has an axial opening 16 through which the flexible rod 2 is sealingly passed.

The higher pressure step is essentially an end face 17 of the piston 14 whose area is less than the area of its opposite end face 18 presenting the lower pressure step. During operation of the hydraulic cylinder 1, the working fluid of its space 4 affects the end face 18 of the piston 14, while its end face 17 having a smaller cross-section affects the viscoelastoplastic material filling the chamber 7 and develops in the latter chamber a pressure higher than the pressure of working fluid in the space 4 of the housing 3. The packing of the stepped piston 14 is made in the form of a bushing 19 rigidly secured in the space 4. The bushing 19 accommodates thereinside a gland 20 of elastic material and an antifriction guide bush 21. Provided on the higher pressure step of the piston 14 is a pressure regulator in the form of a circular groove 22 communicated with the space 4 of the housing 3 via pressure difference valve 23. For charging the viscoelastoplastic material, provision is made of a pipe 24 with a lid 25.

Such a structural arrangement of the pressure developing means enables one to select the areas of the stepped piston end faces, based on their difference, such as to provide for the optimum pressure in the packing chamber thereby reducing the loss of the viscoelastoplastic material.

Figure 5:
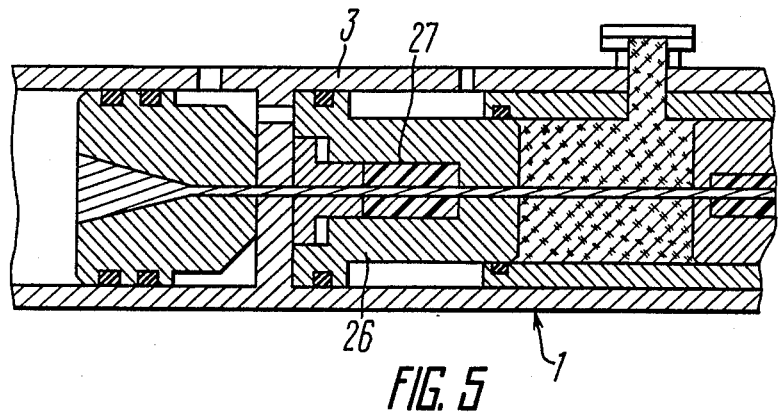
FIG. 5 illustrates another embodiment of the hydraulic cylinder according to the present invention, in longitudinal section.

Shown in FIG. 5 is an embodiment of the hydraulic cylinder 1 wherein the pressure developing means is fashioned as a stepped piston 26 movably mounted in the space of the housing 3 and rigidly coupled with a packing member 27. Such an arrangement of the stepped piston makes for a longer service life of the hydraulic cylinder.

The herein described hydraulic cylinder operates in the following manner.

Pressurized working fluid is delivered to the space 4 (FIG. 4) of the housing 3 to set to motion the piston 5 and the flexible rod 2 coupled therewith. Simultaneously, the working fluid pressure is transmitted via the opening 28 of the bushing 19 to the stepped piston 14 which acts to compress the viscoelastoplastic material in the chamber 7 of the packing assembly 6. Because of the difference between the end face areas of the piston 14, the pressure in the chamber 7 exceeds the working fluid pressure in the space 4. The viscoelastoplastic material compresses the flexible rod 2 and precludes the loss of working fluid over the external surface of the rod. In addition, the viscoelastoplastic material interacts with the identical material preintroduced inside the flexible rod to form thixotropic bonds and restore the uniformity of the structure, and transmits pressure to the interwire space thereby ensuring the sealing of the inner section of the flexible rod 2. Throughout the entire period of operation of the hydraulic cylinder 1, the packing assembly 6 serves to restore and maintain the uniformity of structure of the viscoelastoplastic material in the inner section of the flexible rod 2. The degree of compression of the flexible rod 2 by the viscoelastoplastic material is preset by the pressure regulator 13 maintaining between the space 4 and chamber 7 a pressure difference defined by the optimum operation of the hydraulic cylinder 1 and the flow rate of the viscoelastoplastic material. As the viscoelastoplastic material in the chamber 7 is spent, a new batch of viscoelastoplastic material is charged into the chamber 7 when the end face 17 of the stepped piston 14 reaches its outermost position, said material being delivered via the pipe 24 after first removing the lid 25 and connecting a charging device. While the chamber 7 is being charged withe viscoelastoplastic material, the stepped piston 14 is moving to the initial position and when said position is reached the chamber 7 is regarded as charged. The charging device is removed and the lid 25 is placed on the pipe 24, after which the hydraulic cylinder 1 is ready for further operation.

A structural peculiarity of the herein disclosed hydraulic cylinder 1 with flexible rod 2 resides in the fact that it is made up of separate sleeves, which enables one to develop hydraulic cylinders featuring a long piston stroke and a powerful drive. In addition, the hydraulic cylinder with flexible rod is capable of utilizing gaseous medium.

INDUSTRIAL APPLICABILITY

The herein disclosed hydraulic cylinder with flexible rod can be used most conveniently in the mining industry, in hoisting devices, in feed systems of mining machines, in power rigging for removing mining equipment from worked-out areas and for moving mine headframes, in drilling rigs. The hydraulic cylinder with flexible rod may find extensive application in construction and mechanical engineering, in various cranes, in digging machines and other structures involving the development of great traction forces combined with a long piston stroke.

We claim:

1. A method of packing long-sized porous bodies moved between zones of different pressure, wherein the porous body (T) is moved between zones of different pressure, and is passed through a pressurized thixotropic packing agent (M) between the zones, characterized in that the packing agent (M) is a sealing compound with viscoelastoplastic properties having the following composition (mass percent): ethyl propylene rubber, 10.0–17.1; butyl rubber, 1.9–5.0, industrial oil, 10.0–5.0; L filler (chalk), the balance, and the packing agent is supplied continuously to the porous body (T) under a pressure ($P_3$) exceeding the pressure ($P_1$) in a higher pressure zone whereby the porous body (T) is impregnated with a thixotropic packing agent (M) such that the cross-section of the porous body throughout the entire length thereof be filled with packing agent (M).

2. A method as claimed in claim 1, characterized in that the porous body (T) in the form of a rope is impregnated by repeatedly reciprocating said rope through the packing agent (M) under pressure and temperature conditions ensuring the fluidity of the packing agent and its penetration throughout the entire cross-section of the rope.

3. A hydraulic cylinder with a flexible piston rod comprising a housing (3) with a work space (4) filled with a pressurized working fluid, said space accommodating therein a piston (5) coupled to a flexible rod (2) in the form of a rope and provided with at least one space packing assembly (6) having a chamber (7) filled with a viscous material, through which chamber is passed the flexible rod, characterized in that the viscous material is a viscoelastoplastic material and the chamber (7) of the packing assembly (6) is formed between two packing members (8, 9) positioned in the space of the housing (3), the chamber being coupled to means (10) for maintaining in said chamber a pressure exceeding the pressure of the working fluid in the work space (4) of the housing (3) irrespective of fluctuations in the pressure of the working fluid.

4. A hydraulic cylinder as claimed in claim 3, characterized in that the flexible rod (2) is a locked-coil rope having its interwire space throughout the entire length thereof filled with the viscoelastoplastic material which also fills the chamber (7) of the packing assembly (6).

5. A hydraulic cylinder as claimed in claim 3 wherein the viscoelastoplastic material has the following composition (mass percent): ethyl propylene rubber, 10.0–17.1; butyl rubber, 1.9–5.0; industrial oil, 10.0–5.0; filler (chalk), the balance.

6. A hydraulic cylinder as claimed in claim 3, characterized in that the means (10) for developing pressure in the chamber (7) of the packing assembly (6) is fashioned as a pressure transducer having a lower pressure input (11) and a higher pressure output (12), the higher pressure output (12) being communicated with the chamber (7) of the packing assembluy (6) and the lower pressure input (11)-with the space (4) of the hydraulic cylinder housing (3).

7. A hydraulic cylinder as claimed in claim 6, characterized in hat the pressure transducer is provided with a pressure regulator (13) designed to develop in the chamber (1) of the packing assembly (6) a constant pressure difference relative to the pressure of the working fluid.

8. A hydraulic cylinder as claimed in claim 3, characterized in that the means (10) for developing pressure in the chamber (7) of the packing assembly (6) is fashioned as a stepped piston (14) designed to increase the pressure from a larger diameter step (18) to a smaller diameter step (17) and mounted in the space (4) of the hydraulic cylinderhousing (3) such that the smaller diameter step (17) passes through a packing member (15) to the chamber (7) of the packing assembly (6) and exerts pressure on the viscoelastoplastic material filling the chamber (7) while the larger diameter step is positioned in the space (4) of the hydraulic cylinder housing (3) to take up the working fluid pressure, the stepped piston (14) having an axial opening (16) through which the flexible rod (2) is sealingly passed.

9. A hydraulic cylinder as claimed in claim 8, characterized in that the stepped piston (14) is provided with a pressure regulator fashioned as a circular groove (22) arranged on the smaller diameter step (17) of the piston and communicated with the housing space (4) via pressure difference valve (23) for developing a back-pressure on the larger diameter step (18) to thereby develop in the chamber (7) of the packing assembly (6) a constant pressure difference relative to the working fluid pressure.

10. A hydraulic cylinder as claimed in claim 8, characterized in that the stepped piston (26) is rigidly coupled to a packing member (27) movably mounted in the space of the housing.

* * * * *